(12) United States Patent
Toyoda et al.

(10) Patent No.: US 7,041,739 B2
(45) Date of Patent: May 9, 2006

(54) THERMOPLASTIC ELASTOMER COMPOSITION AND PROCESS FOR PRODUCING THE SAME

(75) Inventors: Hiroshi Toyoda, Sodegaura (JP); Nobuo Oi, Narashino (JP); Eiji Nakaishi, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 203 days.

(21) Appl. No.: 10/472,205

(22) PCT Filed: Mar. 20, 2002

(86) PCT No.: PCT/JP02/02637

§ 371 (c)(1),
(2), (4) Date: Sep. 22, 2003

(87) PCT Pub. No.: WO02/077097

PCT Pub. Date: Oct. 3, 2002

(65) Prior Publication Data

US 2005/0020774 A1   Jan. 27, 2005

(30) Foreign Application Priority Data

| Mar. 26, 2001 | (JP) | ............................. 2001-087025 |
| Mar. 26, 2001 | (JP) | ............................. 2001-087026 |
| Mar. 28, 2001 | (JP) | ............................. 2001-092315 |
| Mar. 28, 2001 | (JP) | ............................. 2001-092316 |

(51) Int. Cl.
- C08F 8/00 (2006.01)
- C08L 27/12 (2006.01)
- C08L 33/02 (2006.01)
- C08L 33/20 (2006.01)
- C08L 37/00 (2006.01)
- C08L 41/00 (2006.01)
- B32B 27/00 (2006.01)

(52) U.S. Cl. .................. 525/191; 525/199; 525/206; 525/214; 525/221; 525/222; 525/238; 525/239; 525/240; 525/241; 428/500; 428/515; 428/516; 428/517; 428/518; 428/519; 428/520; 428/522

(58) Field of Classification Search ............... 525/191, 525/199, 206, 214, 221, 222, 232, 238, 239, 525/240, 241; 428/500, 515, 516, 517, 518, 428/519, 520, 522
See application file for complete search history.

(56) References Cited

U.S. PATENT DOCUMENTS

| 4,493,922 A | * | 1/1985 | Echte et al. .................. 525/71 |
| 5,023,301 A | * | 6/1991 | Burlett et al. ............... 525/232 |
| 6,333,381 B1 | * | 12/2001 | Asada et al. .................. 525/71 |

FOREIGN PATENT DOCUMENTS

| EP | 0 867 471 A1 | 9/1998 |
| JP | 9-143313 A | 6/1997 |
| JP | 10-36580 A | 2/1998 |
| JP | 10-168242 A | 6/1998 |
| JP | 10-237231 A | 9/1998 |
| JP | 10-265616 A | 10/1998 |

\* cited by examiner

Primary Examiner—Nathan M. Nutter
(74) Attorney, Agent, or Firm—Sughrue Mion, PLLC

(57) ABSTRACT

A thermoplastic elastomer composition characterized in that the composition comprises a resin component and at least two kinds of rubber components, wherein at least one kind of the rubber components makes a continuous phase and/or a network-like phase, and the remaining at least one kind of the rubber components makes an isolated phase; and a process for producing the same.

14 Claims, 5 Drawing Sheets

Partially continuous phase        Entirely continuous phase

Incompletely continuous phase        Completely continuous phase

THERMOPLASTIC ELASTOMER COMPOSITION AND PROCESS FOR PRODUCING THE SAME

TECHNICAL FIELD

The present invention relates to a thermoplastic elastomer composition and a process for producing the same. More specifically, the present invention relates to a thermoplastic elastomer composition having superior scratch resistance, and a process for producing the same. Further, the present invention also relates to a thermoplastic elastomer composition having superior abrasion resistance and superiormechanical properties (particularly, elongation at break) as well as superior scratch resistance.

BACKGROUND ART

A thermoplastic elastomer has not been required to have scratch resistance, because a molded article obtained by molding the thermoplastic elastomer is used after coating thereon with a coating agent, and the coated layer has scratch resistance. In recent years, there are less and less articles having such a coated layer, therefore, scratch resistance of material is highly regarded, and, in some cases, their abrasion resistance is also highly regarded in addition to the scratch resistance. And, their levels required are becoming higher and higher. Taking the present condition into consideration, it is difficult to say that a conventional process for producing a thermoplastic elastomer is always satisfactory.

DISCLOSURE OF INVENTION

An object of the present invention is to provide a thermoplastic elastomer composition having superior scratch resistance and a process for producing the same.

Another object of the present invention is to provide a thermoplastic elastomer composition having superior abrasion resistance and superior mechanical properties (particularly, elongation at break) as well as superior scratch resistance.

That is, the present invention provides a thermoplastic elastomer composition comprising a resin component and at least two kinds of rubber components, wherein at least one kind of the rubber components makes a continuous phase and/or a network-like phase, and the remaining at least one kind of the rubber components makes an isolated phase.

Further, the present invention provides a process for producing the above-defined thermoplastic elastomer composition, which comprises feeding a resin component and a rubber component making an isolated phase in a kneading machine, melt-kneading them or heat-treating them dynamically, and thereafter feeding a rubber component making a continuous phase and/or a network like-phase therein.

Still further, the present invention provides a thermoplastic elastomer composition having the above-defined structure, which contains:
(A) a copolymer of an aromatic vinyl compound and ethylene and/or an α-olefin,
(B) a rubber selected from the group consisting of (b1) a hydrogenated aromatic vinyl compound-conjugated diene compound copolymer rubber, and (b2) a copolymer rubber of ethylene and an α-olefin having not less than 4 carbon atoms, and
(C) an olefin based resin.

Still further, the present invention provides a thermoplastic elastomer composition having the above-defined structure, which is obtained by heat-treating dynamically in the presence of a cross-linking agent or in the presence of a cross-linking agent and a cross-linking co-agent:
(A) an ethylene and/or α-olefin-aromatic vinyl compound copolymer,
(B) (b3) an ethylene-α-olefin based copolymer rubber, and
(C) an olefin based resin.

The present invention is explained in detail as follows.

BEST MODE FOR CARRYING OUT THE INVENTION

Figure 1:
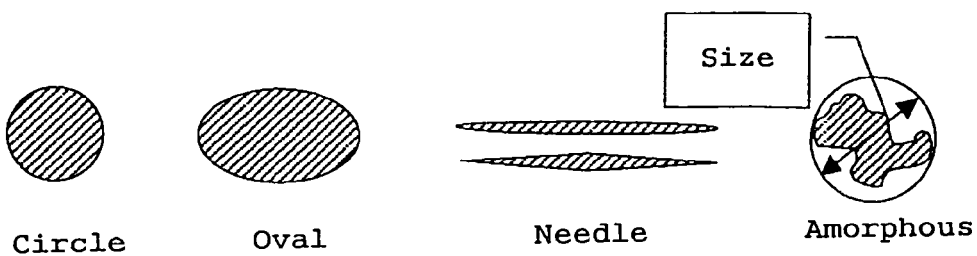
FIG. 1 is an illustration defining a shape of an isolated phase and a size thereof.
Figure 2:
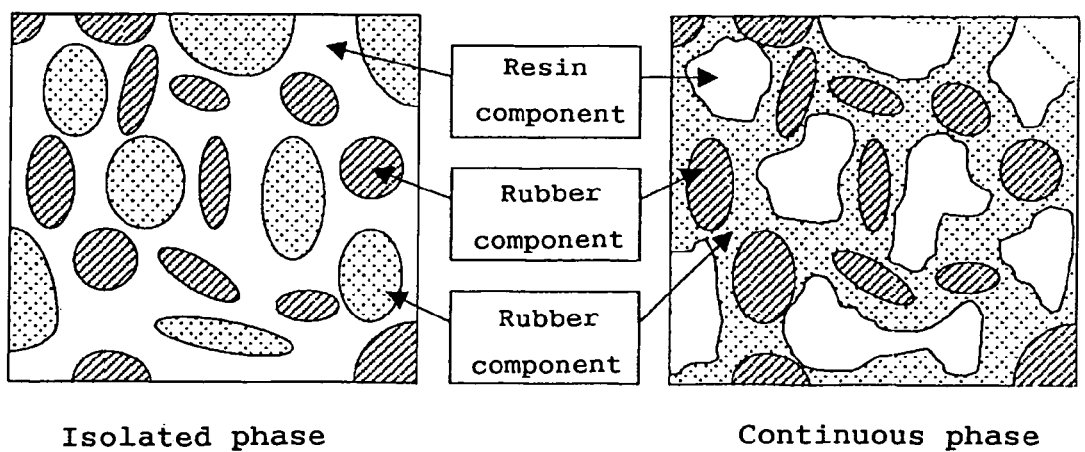
FIG. 2 is an illustration showing an isolated phase and a continuous phase.
Figure 3:
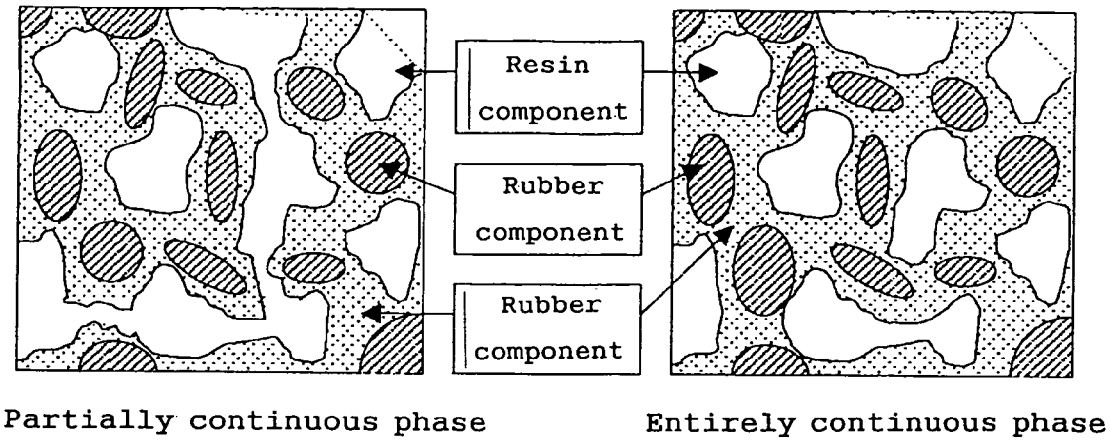
FIG. 3 is an illustration showing a partially continuous phase and an entirely continuous phase.
Figure 4:
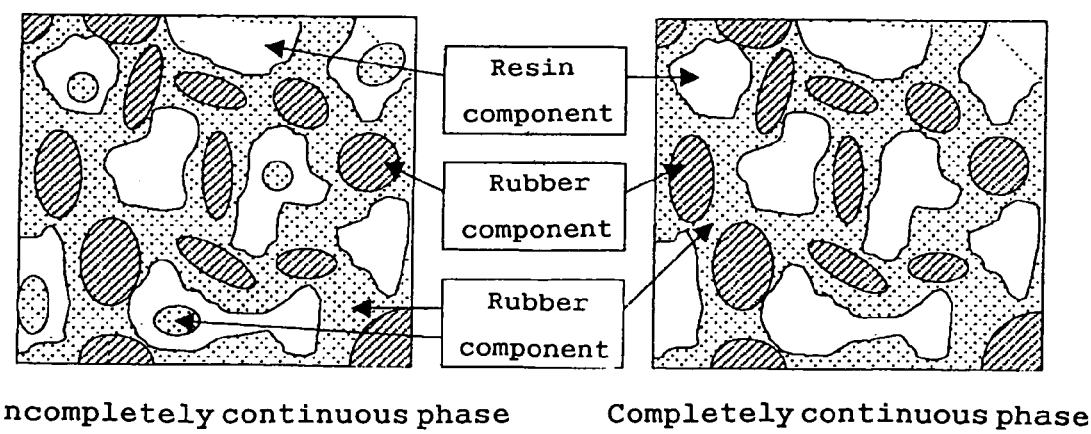
FIG. 4 is an illustration showing an incompletely continuous phase and a completely continuous phase.
Figure 5:
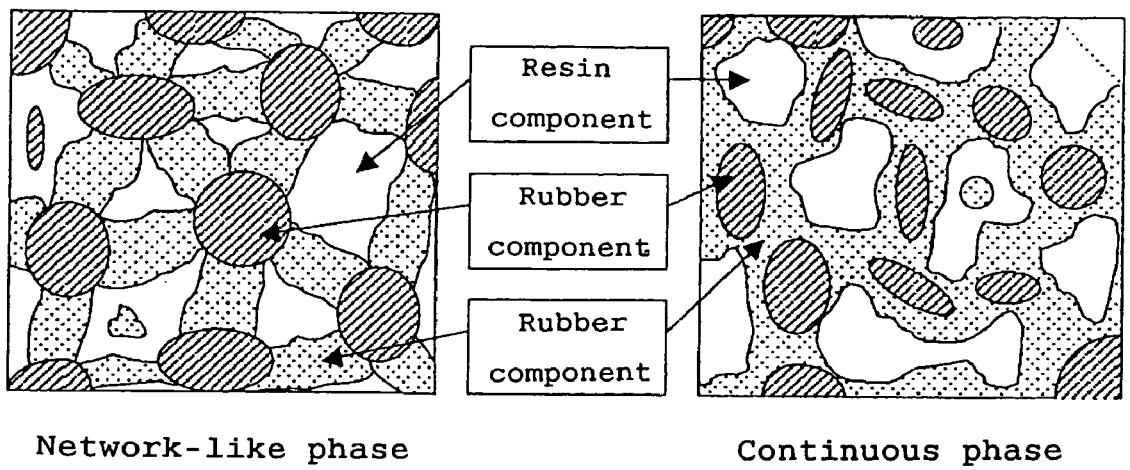
FIG. 5 is an illustration showing a network-like phase and a continuous phase.

The thermoplastic elastomer composition in accordance with the present invention has a phase structure, which comprises a resin component and at least two kinds of rubber components, wherein at least one kind of the rubber components makes a continuous phase and/or a network-like phase, and the remaining at least one kind of the rubber components makes an isolated phase.

Examples of the rubber component used for the composition of the present invention are a rubber and a thermoplastic elastomer. As the rubber, an isoprene based rubber, a butadiene based rubber, a chloroprene rubber, a nitrile rubber, a butyl rubber, an acrylic rubber, an olefin based rubber, an epichlorohydrine rubber, a polysulfide rubber, a silicone rubber, a fluororubber and an urethane rubber are exemplified, and a preferable rubber component is an isoprene based rubber, a butadiene based rubber or an olefin based rubber. Examples of the isoprene based rubber are a natural rubber and an isoprene rubber, examples of the butadiene based rubber are a butadiene rubber, a styrene-butadiene rubber and 1,2-polybutadiene, and examples of the olefin based rubber are an ethylene-α-olefin based copolymer rubber and an ethylene and/or α-olefin-aromatic vinyl compound based copolymer rubber. As the ethylene-α-olefin based copolymer rubber, an ethylene-α-olefin copolymer rubber and an ethylene-α-olefin-conjugated diene copolymer rubber are exemplified.

Examples of the above-mentioned thermoplastic elastomer are a styrene based thermoplastic elastomer, an olefin based thermoplastic elastomer, an urethane based thermoplastic elastomer, an ester based thermoplastic elastomer, an amide based thermoplastic elastomer, a vinyl chloride based thermoplastic elastomer, trans 1,4-polyisoprene and an ionomer, and a preferable thermoplastic elastomer is a styrene based thermoplastic elastomer, an olefin based thermoplastic elastomer, trans 1,4-polyisoprene or an ionomer. Examples of the styrene based thermoplastic elastomer are a styrene-butadiene-styrene block copolymer (SBS), a styrene-isoprene-styrene block copolymer (SIS), a hydrogenated styrene-butadiene-styrene block copolymer (SEBS), a hydrogenated styrene-isoprene-styrene block copolymer (SEPS) and a hydrogenated styrene-butadiene rubber (HSBR), and an example of the olefin based thermoplastic elastomer is a reactor TPO.

As the rubber component, an oil-extended rubber, which contains an oil, may be used.

An example of the oil is a mineral oil such as paraffin, naphthene and aromatic mineral oils. Of these, paraffin mineral oils are preferred.

In the present invention, a combination of the rubber components is selected, wherein at least one kind of the rubber components makes a continuous phase and/or a network-like phase, and the remaining at least one kind of the rubber components makes an isolated phase. In selecting such a combination, for example, it is preferred that viscosity of the rubber component making an isolated phase is larger than that of the rubber component making a continuous phase and/or a network-like phase. When viscosity of the rubber component making an isolated phase is almost the same as that of the rubber component making a continuous phase and/or a network-like phase, it may happen that only an isolated phase or only a continuous phase is made. Further, in selecting such a combination, it is preferred that at least one kind of rubber components is a diene rubber component having a double bond in its structure, and the remaining at least one kind of rubber components is a non-diene rubber component having no double bond therein.

Furthermore, it is preferred to select a combination of a copolymer of an aromatic vinyl compound and ethylene and/or an α-olefin as a continuous phase-making rubber (A) with (b1) a hydrogenated aromatic vinyl compound-conjugated diene compound copolymer, (b2) an ethylene-α-olefin (having 4 or more carbon atoms) copolymer rubber or (b3) an ethylene-α-olefin (having 3 or more carbon atoms) based copolymer rubber as an isolated phase-making rubber(B).

When selecting the above-mentioned combination of a diene rubber component with a non-diene rubber component, preferred examples of the diene rubber component are natural rubber, isoprene rubber, butadiene rubber, styrene-butadiene rubber, ethylene-α-olefin-conjugated diene copolymer rubber, styrene-butadiene-styrene copolymer and styrene-isoprene-styrene copolymer. And preferred examples of the non-diene rubber component are a hydrogenated styrene-butadiene-styrene copolymer, a hydrogenated styrene-isoprene-styrene copolymer, a hydrogenated styrene-butadiene rubber, an ethylene and/or α-olefin-aromatic vinyl compound copolymer, an ethylene-α-olefin copolymer and a reactor TPO. When a combination of the diene rubber with the non-diene rubber is selected, an isolated phase and a continuous phase can be easily made by heat-treating dynamically in the presence of a cross-linking agent.

An isolated phase means a phase wherein the same component (the rubber component) does not continue but disperses individually, or means a phase wherein the same component (the rubber component) is dispersed in a continuous phase like a particle form, in an observation of a cross section of the thermoplastic elastomer composition. The isolated phase has a shape such as a circle, an oval, a needle and an amorphous. And, particles having a different shape may be present. A size of the isolated phase is preferably not more than 500 µm in average, and more preferably not more than 50 µm in average. Each size of the shapes other than circles is defined by a diameter of a circumscribed circle. With respect to a circle or a shape close to a circle, it is preferably not more than 10 µm. When the isolated phase is too large, the surface may become sandy, and as a result, appearance may deteriorate.

A continuous phase means a phase wherein the same component (the rubber component) continues and disperses partially or entirely, or continues and disperses completely or incompletely, in an observation of a cross section of the thermoplastic elastomer composition. The entirely continuous phase means that the continuous phase is made in the entire region of the thermoplastic elastomer composition, and the partially continuous phase means that the continuous phase is made in a partial region of the thermoplastic elastomer composition. The completely continuous phase means a continuous phase having no isolated phase therein, and the incompletely continuous phase means a continuous phase partially making an isolated phase.

A network-like phase means a phase wherein the isolated phases are bound with one another to continue and disperse entirely or partially, or completely or incompletely, in an observation of a cross section of the thermoplastic elastomer composition. The entirely continuous phase means that the continuous phase is made in the entire region of the thermoplastic elastomer composition, and the partially continuous phase means that the continuous phase is made in a partial region of the thermoplastic elastomer composition. The completely continuous phase means a continuous phase having no isolated phase therein, and the incompletely continuous phase means a continuous phase partially making an isolated phase.

It is particularly recommendable to use a combination of a copolymer of ethylene and/or an α-olefin and an aromatic vinyl compound as the rubber component (A) making the continuous phase and rubber selected from the group consisting of (b1) a hydrogenated aromatic vinyl compound-conjugated diene compound copolymer and (b2) ethylene-α-olefin (having 4 or more carbon atoms) copolymer rubber as the rubber (B) making the isolated phase, and to use an olefin based resin as the resin, because there can be provided a thermoplastic elastomer composition having superior abrasion resistance and superior mechanical properties (particularly elongation at break) as well as superior scratch resistance. It is also recommendable to use a rubber combination of an ethylene and/or α-olefin-aromatic vinyl compound copolymer (A) and an isolated phase-making ethylene-α-olefin (having 3 or more carbon atoms) based copolymer rubber (b3), and to subject such a combination and the olefin based resin (C) to dynamic heat-treatment in the presence of a cross-linking agent or in the presence of a cross-linking agent and a cross-linking co-agent, thereby obtaining a thermoplastic elastomer composition having the above-mentioned structure, because there can be obtained a thermoplastic elastomer composition having physical properties similar to the above.

The ethylene and/or α-olefin-aromatic vinyl compound copolymer (A) is a random copolymer. Examples of the α-olefin constituting the copolymer are propylene, 1-butene, 1-pentene, 1-hexene, 4-methyl-1-pentene, 1-octene and 1-decene. Among them, preferable is propylene, 1-butene, 1-hexene or 1-octene. Examples of the aromatic vinyl compound are an alkyl styrene such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene and p-sec-butylstyrene; styrene; an alkenylbenzene such as 2-phenyl-1-propylene and 2-phenyl-1-butene; a bisalkenylbenzene such as divinylbenzene; and a vinylnaphthalene such as 1-vinylnaphthalene. Among these alkenyl aromatic compounds, styrene, p-methylstyrene, m-methylstyrene, o-methylstyrene, p-tert-butylstyrene, 2-phenyl-1-propylene, divinylbenzene or 1-vinylnaphthalene is preferable, and styrene is particularly preferable, from a viewpoint of easy synthesis and copolymerizability (easy production of a monomer, and easy copolymerization with ethylene and/or an α-olefin).

A content of the aromatic vinyl compound is preferably from 5 to 50% by weight, and more preferably from 10 to 35% by weight. Incidentally, the sum of the aromatic vinyl compound, ethylene and the α-olefin is 100% by weight. When the content of the aromatic vinyl compound is less than 5% by weight, the obtained composition may deteriorate in its elasticity and transparency. On the other hand, when the content exceeds 50% by weight, its elasticity may deteriorate. As the copolymer of ethylene and/or α-olefin and the aromatic vinyl compound, a random copolymer is preferred, and an ethylene-aromatic vinyl compound copolymer is particularly preferred from a viewpoint of flexibility and elastic recovery.

The above-mentioned copolymer of ethylene and/or α-olefin and the aromatic vinyl compound can be produced according to a process described in U.S. Pat. No. 6,187,889 or EP laid open No. 1002808.

The hydrogenated aromatic vinyl compound-conjugated diene compound block copolymer as the rubber component (B) includes a (I)-(II) block copolymer, a (I)-(II)-(III) block copolymer and a (I)-(II)-(I) block copolymer, wherein (I) is an aromatic vinyl compound polymer block, (II) is a conjugated diene polymer block or an aromatic vinyl compound-conjugated diene random copolymer block, and (III) is an aromatic vinyl compound-conjugated diene copolymer tapering block, in which the aromatic vinyl compound component in the copolymer increases little by little toward a definite direction of the polymer chain.

Examples of the aromatic vinyl compound are styrene, an α-methylstyrene, p-methylstyrene, vinylxylene and vinylnaphthalene, and styrene is preferable. Examples of the conjugated diene compound are butadiene, isoprene, 2,3-dimethyl-1,3-butadiene and2-neopentyl-1,3-butadiene, and from an industrial point of view, butadiene or isoprene is preferable, and butadiene is the most preferable. A content of the aromatic vinyl compound is preferably 10 to 60% by weight, and more preferably 10 to 40% by weight. When said content is less than 10% by weight or more than 60% by weight, mechanical properties may decrease.

Although a degree of hydrogenation is not particularly limited, it is generally 70% or more, preferably 80% or more, and more preferably 90% or more of a polymerized conjugated diene.

Further, a preferable example of the α-olefin in the copolymer rubber (b2) of ethylene and the α-olefin having 4 or more carbon atoms is an α-olefin having 4 to 12 carbon atoms such as 1-butene, 1-pentene, 1-hexene, 4-methyl-1-pentene, 1-octene and 1-decene. Among them, 1-butene, 1-hexene or 1-octene is preferable. A content of the α-olefin is preferably 10 to 50% by weight, and more preferably 20 to 40% by weight.

Specific examples of the copolymer (b2) of ethylene and the α-olefin having 4 or more carbon atoms are an ethylene-1-butene copolymer rubber, an ethylene-1-pentene copolymer rubber, an ethylene-1-hexene copolymer rubber, an ethylene-1-octene copolymer rubber and an ethylene-1-decene copolymer rubber.

Further, examples of the ethylene-α-olefin based copolymer rubber (b3), which is used for obtaining a thermoplastic elastomer composition by a dynamic heat-treatment in the presence of a cross-linking agent or in the presence of a cross-linking agent and a cross-linking co-agent, are a copolymer rubber of ethylene and an α-olefin having 3 or more carbon atoms and a copolymer of ethylene, said α-olefin and a polyene. Examples of the α-olefin in the copolymer rubber are propylene, 1-butene, 1-pentene, 1-hexene, 4-methyl-1-pentene, 1-octene and 1-decene. Among them, preferable is propylene, 1-butene, 1-hexene or 1-octene. Examples of the polyene are a linear chain non-conjugated diene such as 1,4-hexadiene, 1,6-octadiene, 2-methyl-1,5-hexadiene, 6-methyl-1,5-heptadiene and 7-methyl-1,6-octadiene; a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and a triene such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. Among them, a cyclic non-conjugated diene is preferable, and5-ethylidene-2-norbornene or dicyclopentadiene is particularly preferable. A content of the diene is preferably 5 to 40 and more preferably 10 to 20 in terms of an iodine value.

Specific examples of the ethylene-α-olefin based copolymer rubber (b3) are those of the copolymer rubber of ethylene and an α-olefin having 3 or more carbon atoms exemplified above and an ethylene-propylene copolymer rubber, an ethylene-1-butene copolymer rubber, an ethylene-1-hexene copolymer rubber, an ethylene-propylene-5-ethylidene-2-norbornene copolymer rubber and an ethylene-propylene-dicyclopentadiene copolymer rubber.

As the ethylene-α-olefin based copolymer rubber (b3), preferred are those having Mooney viscosity at 100° C. ($ML_{1+4}$ 100° C.) of preferably from 5 to 150, and more preferably from 20 to 100. When the Mooney viscosity is less than 5, mechanical strength may markedly deteriorate. On the other hand, when the Mooney viscosity exceeds 150, the molded article may deteriorate in its appearance. Incidentally, when oil extended rubber is used as the ethylene-α-olefin based copolymer rubber, a value of Mooney viscosity of such an oil extended rubber is based on that of the ethylene-α-olefin based copolymer rubber containing an extender oil.

Examples of oils used for the oil-extended rubber are paraffin, naphthene and aromatic mineral oils. Of these, paraffin mineral oils are preferred.

The resin component makes a phase in the space excluding the rubber component, which phase is an isolated phase and/or a continuous phase.

The resin component used in the present invention is a thermoplastic resin. Examples of the thermoplastic resin are olefin based resins, styrene based resins, vinyl chloride based resins, acrylic based resins and carbonate based resins. Of these, olefin based resins or styrene based resins are preferred. A mixture of the olefin resin and the styrene resin may be used. Examples of the styrene resin are polystyrenes and high impact polystyrenes. The most preferred is the olefin based resin.

Examples of the olefin based resin (C) are an ethylene based resin, a propylene based resin and a butene based resin, and these resins may be used alone or in a mixture thereof. Examples of said ethylene based resin are a high density polyethylene, a low density polyethylene, a linear low density polyethylene and an ethylene copolymer containing ethylene as a main monomer. Examples of said ethylene copolymer containing ethylene as a main monomer are an ethylene-vinyl acetate copolymer, an ethylene-methyl methacrylate copolymer and a copolymer of ethylene and an α-olefin having 3 to 12 carbon atoms. Examples of said propylene based resin are a propylene homopolymer and a copolymer containing propylene as a main monomer. Examples of said copolymer containing propylene as a main monomer are a copolymer of propylene and an α-olefin having 2 or 4 to 12 carbon atoms and a polypropylene grafted by styrene or a functional group. As the α-olefin in the propylene-α-olefin copolymer, ethylene is preferable, and examples of a propylene-ethylene copolymer are a random copolymer and a block copolymer. Examples of said butene resin are 1-butene homopolymer and a copolymer of 1-butene and other monomer(s).

As the olefin based resin, a propylene based resin is preferable from a viewpoint of heat resistance and industrialization.

The olefin based resin has a melt flow rate (JIS-K-7210, 230C., 21.18 N), hereinafter referred to as MFR, of preferably from 0.1 to 150 g/10 min, and more preferably from 1 to 100 g/10 min. When MFR is less than 0.1 g/10 min, moldability may deteriorate, and on the other hand, when MFR exceeds 100 g/10 min, mechanical properties may markedly deteriorate.

More specifically, examples of the propylene based resin are a propylene homopolymer (C1), a propylene-ethylene random copolymer (C2) and a propylene-ethylene block copolymer (C3). A combination containing at least two of (C1), (C2) and (C3) may be used.

With respect to the propylene homopolymer (C1), those having high crystallinity are preferred, when the stiffness is desired to be high.

With respect to the propylene-ethylene random copolymer (C2), those having a low ethylene content or having high crystallinity are preferred, when the stiffness is desired to be high. On the contrary, those having a high ethylene content or having low crystallinity are preferred, when the stiffness is desired to be low. Which is selected can be determined depending upon the purposes.

The propylene-ethylene block copolymer (C3) comprises a first segment and a second segment, wherein the first segment is a homopolypropylene portion obtained in homopolymerizing propylene, and the second segment is a propylene-ethylene random copolymer portion. It is permitted to use, as the first segment, a propylene-ethylene random copolymer having a different ethylene content from that of the second segment. When the stiffness is desired to be high, those having a low content of the second segment, namely the propylene-ethylene random copolymer portion, or those having a low ethylene content in the propylene-ethylene random copolymer portion are preferred. Which is selected can be determined depending upon the purposes.

With respect to the content of respective components in the thermoplastic elastomer composition in accordance with the present invention, a content of (A) is preferably from 10 to 80% by weight, a content of (B) is preferably from 10 to 80% by weight, and a content of (C) is preferably from 60 to 10% by weight, provided that (A)+(B)+(C)=100 parts by weight. When (A) is less than 10% by weight, the scratch resistance and the abrasion resistance may deteriorate, and on the other hand, when (A) exceeds 80% by weight, the mechanical properties may deteriorate. When (B) is less than 10% by weight, the mechanical properties may deteriorate, and on the other hand, when (B) exceeds 80% by weight, the scratch resistance and the abrasion resistance may deteriorate. When (C) is less than 10% by weight, the flowability may deteriorate to result in poor moldability, and on the other hand, when (C) exceeds 60% by weight, the scratch resistance and the abrasion resistance may deteriorate.

In the present invention, in addition to the above-mentioned rubber component and resin component, inorganic fillers such as talc, calcium carbonate and calcined kaolin; organic fillers such as organic fibers, wood powder and cellulose powder; lubricants such as fatty acid amides and silicones; antioxidants such as a phenol antioxidant, a sulfur antioxidant, a phosphorus antioxidant, a lactone antioxidant and a vitamin antioxidant; weather stabilizers; ultraviolet absorbers such as a benztriazol ultraviolet absorber, a triazine ultraviolet absorber, an anilide ultraviolet absorber and a benzophenone ultraviolet absorber; heat stabilizers; light stabilizers such as a hindered amine light stabilizer and a benzoate light stabilizer; anti-static agents; nucleating agents and pigments may be used.

In order to improve the abrasion resistance moreover, it is preferred to contain the inorganic filler, and it is more preferred to contain the inorganic filler and the lubricant. For obtaining a thermoplastic elastomer composition having flexibility, calcium carbonate is preferred.

For obtaining the thermoplastic elastomer composition in accordance with the present invention, a continuous type or batch type kneading machine may be used to perform melt-kneading. As the continuous type kneading machine, a single screw extruder and a twin screw extruder are exemplified. As the batch type kneading machine, a kneader and Banbury mixer are exemplified. Depending upon the shape of the resin component and the rubber component, the batch type and the continuous type may be used at the same time. If necessary, a dynamic heat-treatment using a cross-linking agent or a combination of a cross-linking agent and a cross-linking co-agent may be carried out.

As a method for feeding the resin component and the rubber component, even if the resin, the isolated phase-making rubber and the continuous phase and/or network-like phase-making rubber are fed at the same time in the kneading machine and kneaded therein, at least one rubber component can make the continuous phase and/or network-like phase, and the remaining at least one rubber component can make the isolated phase. However, it is preferred to feed and knead the resin component and the isolated phase-making rubber into the kneading machine, melt-disperse them and thereafter feed the continuous phase and/or network-like phase-making rubber therein. When a dynamic heat-treatment is applied, it is permitted to feed the resin, the isolated phase-making rubber and the continuous phase and/or network-like phase-making rubber in the kneading machine, or to feed the resin and the isolated phase-making rubber in the kneading machine, and after completing the dynamic heat-treatment feed the continuous phase and/or network-like phase-making rubber into the kneading machine. However, when the diene rubber is used for both the isolated phase-making rubber and the continuous phase and/or network-like phase-making rubber, or the non-diene rubber is used for both the isolated phase-making rubber and the continuous phase and/or network-like phase-making rubber, it is necessary to feed the resin and the isolated phase-making rubber into the kneading machine, and after completing the dynamic heat-treatment feed the continuous phase and/or network-like phase-making rubber into the kneading machine.

As the cross-linking agent used for the dynamic heat-treatment, sulfur, organic peroxides and phenol resins are exemplified. Organic peroxides are preferred. Specific examples of the organic peroxides used are 2,5-dimethyl-2, 5-di(t-butylperoxy)hexane, 2,5-dimethyl-2,5-di(t-butylperoxy)hexyn, 1,3-bis(t-butylperoxyisopropyl)benzene, 1,1-di(t-butylperoxy-3,5,5-trimethylcyclohexane), 2,5-dimethyl-2,5-di(peroxybenzoyl)hexyn and dicumyl peroxide.

As the cross-linking co-agent, compounds having two or more double bonds in the molecular structure are preferred. Specific examples thereof are N,N'-m-phenylene bismaleimide, toluylene bismaleimide, p-quinone dioxime, nitrosobenzene, diphenylguanidine, trimethylolpropane trimethacrylate and divinylbenzene.

An amount of the cross-linking agent in the dynamic heat-treatment carried out in the presence of the cross-linking agent can be determined appropriately within a range of preferably from 0.01 to 10 parts by weight, which range is not limitative.

An amount of the cross-linking co-agent can be also determined appropriately within a range of preferably from 0.1 to 10 parts by weight, which range is not limitative.

The thermoplastic elastomer composition in accordance with the present invention can be used in extrusion molding, injection molding, press molding, blow molding and powder molding.

There can be applied for various uses, and examples thereof are parts for automobiles, railroads, air-planes and ships, electric appliances, building parts for construction, stationery and sundry goods, wherein scratch resistance or both the scratch resistance and abrasion resistance are required.

Further, the thermoplastic elastomer composition in accordance with the present invention can be used in multi-layer molding and a sheet. A preferred example of a multi-layered article is an article molded by means of two-layer molding, wherein a core portion comprises the olefin resin and a skin portion comprises the thermoplastic elastomer composition in accordance with the present invention. When the skin portion is desired to have a sense of softness, the thermoplastic elastomer composition has a hardness (shore A) of preferably not more than 99, and more preferably from 90 to 60. As the olefin resin for the core portion, propylene resins, ethylene resins and olefin thermoplastic elastomers are exemplified.

For obtaining the above-mentioned article molded by means of two-layer molding, for example, co-extrusion with use of an extruder, coinjection molding and insert molding can be applied.

As preferred embodiments of the multi-layered article, car interior parts are exemplified. Specific examples thereof are instrumental panels, doors, arm rests, grab rails, shift knobs, instrumental grips, side brake knobs, console boxes, glass runs and weather strips.

The present invention is explained in more detail with reference to the following Examples.

EXAMPLE

[I] Raw Materials (A) Continuous Phase-making Rubber (a-1) Ethylene-styrene Copolymer The ethylene-styrene copolymer (ESC) was produced by continuously copolymerizing ethylene and styrene using a 100 liter SUS polymerization reactor equipped with a stirring blade. That is, from the bottom of the polymerization reactor, hexane as a polymerization solvent, ethylene and styrene were continuously supplied at the rate of 84.7 kg/hr, 2.8 kg/hr and 4.15 kg/hr, respectively. On the other hand, from the top of the polymerization reactor, the resulting polymerization liquid was continuously taken out so as to keep the polymerization liquid in the polymerization reactor to 100 liters. As a catalyst, isopropylidene(cyclopentadienyl)(3-tert-butyl-5-methyl-2-ph enoxy)titanium dichloride, N,N-dimethylaniliniumtetraxis(pentafluorophenyl)borate and triisobutylaluminum were continuously supplied in the polymerization reactor from the bottom thereof at the rate of 0.348 g/hr, 1.081 g/hr and 6.912 g/hr, respectively. The copolymerization reaction was carried out at 50° C. while circulating cooled water in a jacket mounted on the outside of the polymerization reactor. A little ethanol was added to the polymerization liquid taken out of the polymerization reactor to terminate the polymerization reaction, followed by removal of monomer and water washing. Thereafter, the solvent was removed by means of steam in a large amount of water, thereby isolating the copolymer, which was dried overnight under reduced pressure. According to the operation mentioned above, the ethylene-styrene copolymerization was carried out at the rate of 2 kg/hr. The copolymer was found to have intrinsic viscosity [η] of 2.31 dl/g, measured at 135° C. using an Ubbelohde viscometer and tetralin as a solvent. Using a differential thermal analyzer (DSC 220 manufactured by Seiko Instruments Inc.), a fusion curve was obtained using the programmed temperature rate of 10° C./min, and as a result, a melting point and a glass transition point were found to be 44° C. and −20° C., respectively.

A styrene content measured by means of $^{13}$C-NMR (JNM-EX 270 manufactured by JEOL Ltd.), measurement solvent: o-dichlorobenzene, measurement temperature: 135° C.) was found to be 16 mol %, and a ratio of a peak area appearing on 34.0~36.0 ppm to that appearing on 36.0~38.0 ppm was found to be 0.019.

(B) Isolated Phase-making Rubber (b-1) Hydrogenated Styrene-butadiene-styrene Copolymer
b-1-1; Commercial name: TUFTEC H1042 (hydrogenated styrene-butadiene-styrene copolymer), manufactured by Asahi Chemical Industry Co., Ltd.

(b-2) Ethylene-α-olefin Copolymer Rubber (b-2-1) Oil Extended Ethylene-propylene-non-conjugated Diene Copolymer Rubber
[Mooney viscosity ($ML_{1+4}$100° C.)=79, non-conjugated diene=ENB, amount oil extended=40 parts by weight based on 100 parts by weight of rubber]

(b-2-2) Ethylene-1-butene Copolymer Rubber
MFR (190° C., 21.18 N)=0.6 g/10 min, butene content=17% by weight (b-2-3) Ethylene-propylene Copolymer Rubber
MFR (190° C., 21.18 N)=0.7 g/10 min, propylene content=27% by weight (C) Olefin Resin (c-1) Propylene-ethylene Block Copolymer
MFR (JIS-K-7210, 230° C., 21.18 N)=65 g/10 min, NOBLENE AX568, manufactured by Sumitomo Chemical Co., Ltd.

[II] Measurement Method

The composition obtained was molded with a press molding machine at 200° C., thereby obtaining a 150 mm×150 mm flat plate having a thickness of 2 mm, which was then subjected to measurements desired.

(1) Phase observation: an ultra-thin piece sliced with an ultra-microtome was dyed with $RuO_2$ to obtain a specimen, which was observed with a transmission electron microscope (6000 magnifications).

(2) Scratch resistance test: using a surface property tester (SHINTO SCIENTFIC Co., Ltd.), a surface of a plate obtained by press molding was scratched with a scratching needle, which was loaded with a 300 g weight and moved at a definite speed, and the resulting scratch was visually observed to obtain an evaluation, ○; good (scratch is not remarkable), and X; bad (scratch is remarkable).

(3) Abrasion resistance test: cloth (shirting No. 3) and a plate were mounted to a color fastness rubbing tester, a load of 500 g was applied thereto and an abrasion surface through mirror rubbing of 200 times with the cloth was visually observed to obtain an evaluation, ○; good (abrasion is not remarkable), and X; bad (abrasion is remarkable).

(4) Tension test: a plate obtained by press molding using a JIS No.3 dumbbell was punched to prepare a specimen, which was pulled at the rate of 200 mm/min with a tension tester, thereby finding break strength and elongation at break (according to JIS-K-6251).

Example 1 and Comparative Example 1

To the blend as shown in Table 1, 0.1 part by weight of a cross-linking co-agent, trimethylolpropane trimethacrylate, and 0.128 parts by weight of a cross-linking agent, 2,5-dimethyl-2,5-di(t-butylperoxy)hexyn were added in two equal divisions, followed by dynamic heat-treatment with a laboplastomill. The obtained composition was molded, and the molded article was measured. The results are as shown in Table 1.

TABLE 1

Figure 6:
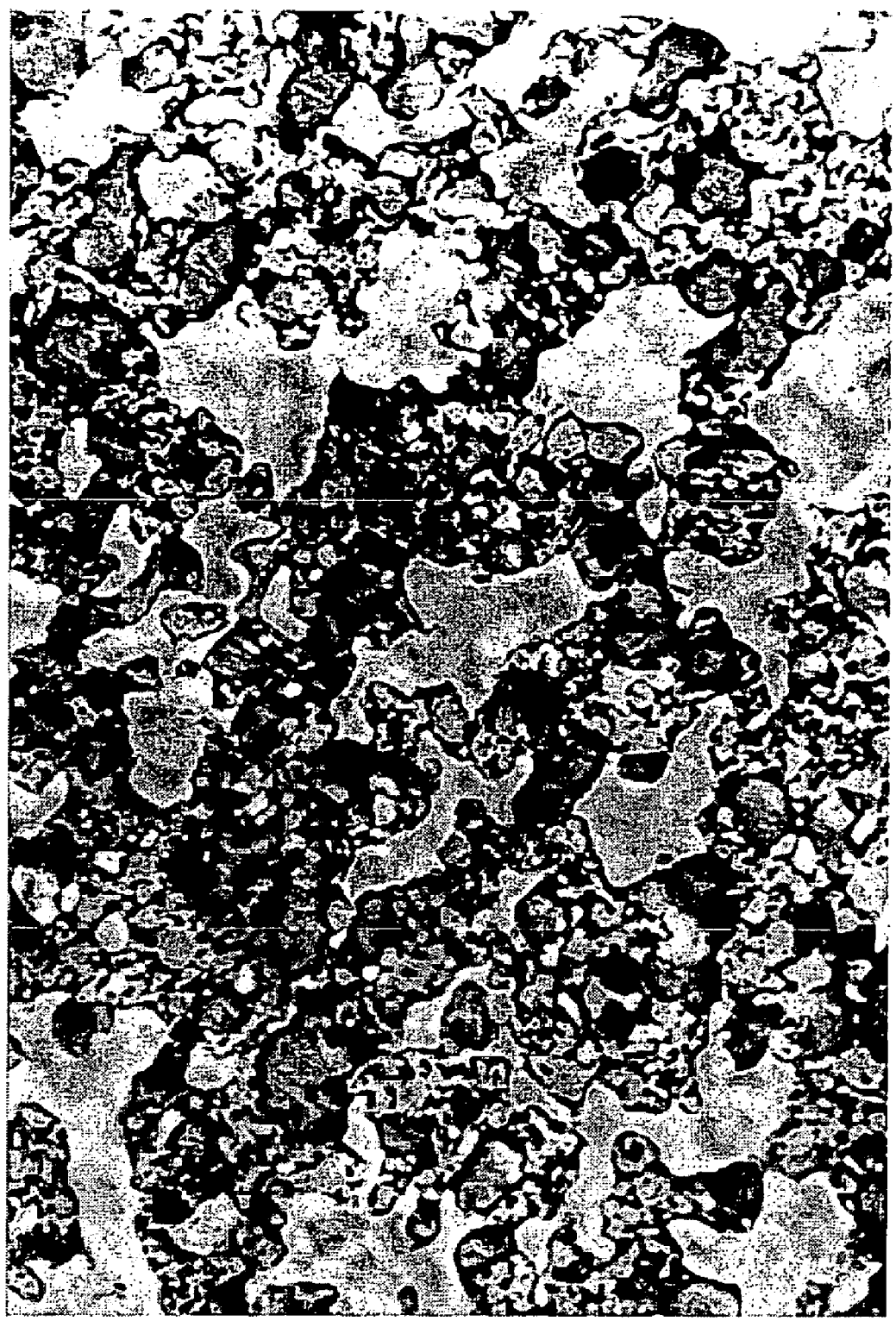
FIG. 6 is a transmission microscopic photograph obtained in Example 1.
Figure 7:
FIG. 7 is a transmission microscopic photograph obtained in Comparative Example 1.

|  | Example 1 | Comparative Example 1 |
|---|---|---|
| a-1 | 15 parts by weight |  |
| b-1-1 | 15 parts by weight |  |
| b-2-1 | 30 parts by weight | 60 parts by weight |
| c-1 | 40 parts by weight | 40 parts by weight |
| Scratch resistance | ○ | X |
| Phase observation | A continuous phase and an isolated phase comprising rubber were observed. (FIG. 6) | Only an isolated phase was observed. (FIG. 7) |

Example 2 and Comparative Example 2

The blends shown in Table 2 were melt-kneaded with a laboplastomill, respectively. Each of the obtained compositions was molded, and the molded article was measured. The results are as shown in Table 2.

TABLE 2

|  | Example 2 | Comparative Example 2 |
|---|---|---|
| Blending (parts by weight) |  |  |
| a-1 | 30 |  |
| b-1-1 | 30 | 60 |
| c-1 | 40 | 40 |
| Evaluation result |  |  |
| Break strength (MPa) | 5.1 | 3.0 |
| Elongation at break (%) | 120 | 280 |

TABLE 2-continued

|  | Example 2 | Comparative Example 2 |
|---|---|---|
| Scratch resistance | ○ | X |
| Abrasion resistance | ○ | X |

Examples 3 and 4 and Comparative Example 3

The blends shown in Table 3 were melt-kneaded with a laboplastomill, respectively. Each of the obtained compositions was molded, and the molded article was measured. The results are as shown in Table 3.

TABLE 3

|  | Example 3 | Example 4 | Comparative Example 3 |
|---|---|---|---|
| Blending (parts by weight) |  |  |  |
| a-1 | 30 | 30 |  |
| b-2-2 | 30 |  | 60 |
| b-2-3 |  | 30 |  |
| c-1 | 40 | 40 | 40 |
| Evaluation result |  |  |  |
| Break strength (MPa) | 6.2 | 3.2 | 4.3 |
| Elongation at break (%) | 130 | 70 | 170 |
| Scratch resistance | ○ | ○ | X |
| Abrasion resistance | ○ | ○ | X |

Example 5

To the blend as shown in Table 4, 0.1 part by weight of a cross-linking co-agent, trimethylolpropane trimethacrylate, and 0.128 parts by weight of a cross-linking agent, 2,5-dimethyl-2,5-di(t-butylperoxy)hexyn were added in two equal divisions, followed by dynamic heat-treatment with a laboplastomill. The obtained composition was molded, and the molded article was measured. The results are as shown in Table 4. Physical properties of the composition obtained in the foregoing Comparative Example 1 are also shown therein.

TABLE 4

|  | Example 5 | Comparative Example 1 |
|---|---|---|
| Blending (parts by weight) |  |  |
| a-1 | 30 |  |
| b-2-1 | 30 | 60 |
| c-1 | 40 | 40 |
| Evaluation result |  |  |
| Break strength (MPa) | 5.3 | 3.9 |
| Elongation at break (%) | 410 | 350 |
| Scratch resistance | ○ | X |
| Abrasion resistance | ○ | X |

INDUSTRIAL APPLICABILITY

As mentioned above, the present invention can provide a thermoplastic elastomer composition having superior scratch resistance, and a process for producing the same.

The invention claimed is:

1. A thermoplastic elastomer composition comprising an olefin based resin (C) and at least two rubber components, wherein at least one of the rubber components is an ethylene-aromatic vinyl compound copolymer and/or an α-olefin-aromatic vinyl compound copolymer (A), which makes a continuous phase and/or a network-like phase, and the remaining at least one of the rubber components is a rubber (B) selected from the group consisting of (b 1) a hydrogenated aromatic vinyl compound-conjugated diene compound copolymer rubber, and (b2) a copolymer rubber of ethylene and an α-olefin having not less than 4 carbon atoms, which makes an isolated phase.

2. The thermoplastic elastomer composition according to claim 1, wherein the aromatic vinyl compound in (A) and (b1) is styrene, and the conjugated diene compound in (b1) is butadiene.

3. The thermoplastic elastomer composition according to claim 1, wherein (C) is a propylene based resin.

4. The thermoplastic elastomer composition according to claim 1, wherein a content of (A) is 10 to 80% by weight, a content of (B) is 10 to 80% by weight, and a content of (C) is 60 to 10% by weight, based on 100% by weight of a sum of (A), (B) and (C).

5. A process for producing a thermoplastic elastomer composition comprising an olefin based resin (C) and at least two rubber components, wherein at least one of the rubber components is an ethylene-aromatic vinyl compound copolymer and/or an α-olefin-aromatic vinyl compound copolymer (A), which makes a continuous phase and/or a network-like phase, and the remaining at least one of the rubber components is a copolymer rubber of ethylene and α-olefin having not less than 3 carbon atoms (b3), which makes an isolated phase, the process comprising the step of heat-treating dynamically the components (A), (b3) and (C) in the presence of a cross-linking agent or in the presence of a cross-linking agent and a cross-linking co-agent.

6. The process according to claim 5, wherein the cross-linking agent is an organic peroxide, and the cross-linking co-agent is a compound having at least two double bonds in its molecular structure.

7. The process according to claim 5, wherein the aromatic vinyl compound in (A) is styrene.

8. The process according to claim 5, wherein (b3) is an ethylene-α-olefin-non-conjugated diene copolymer rubber.

9. The process according to claim 5, wherein (C) is a propylene based resin.

10. The process according to claim 5, wherein a content of (A) is 10 to 80% by weight, a content of (B) is 10 to 80% by weight, and a content of (C) is 60 to 10% by weight, based on 100% by weight of a sum of (A), (B) and (C).

11. A sheet comprising the thermoplastic elastomer composition according to claim 1.

12. A multi-layer molded article, whose core portion comprises an olefin resin and skin portion comprises a thermoplastic elastomer composition according to claim 1.

13. A multi-layer molded article, whose core portion comprises an olefin resin and skin portion comprises a thermoplastic elastomer composition according to claim 5.

14. The process according to claim 5, wherein the step is carried out by feeding the olefin based resin (C) and the copolymer rubber (b3) in a kneading machine, melt-kneading them or heat-treating them dynamically, and thereafter feeding the copolymer (A).

* * * * *